(12) United States Patent
Wu et al.

(10) Patent No.: US 9,195,924 B2
(45) Date of Patent: Nov. 24, 2015

(54) BAND-GAP REFERENCE SELF-STARTING CIRCUIT AND A PASSIVE RADIO FREQUENCY IDENTIFICATION TAG

(71) Applicants: EXCELIO TECHNOLOGY (SHENZHEN) CO., LTD., Shenzhen (CN); WUXI EXCELIO TECHNOLOGY CO., LTD., Wuxi, Jiangsu (CN)

(72) Inventors: Patrick Bian Wu, Shenzhen (CN); Xingyi Wang, Shenzhen (CN); Fuqiang Han, Shenzhen (CN); Shehu Qi, Shenzhen (CN); Yuanming Luo, Shenzhen (CN)

(73) Assignees: EXCELIO Technology (Shenzhen) CO., LTD, Shenzhen (CN); Wuxi EXCELIO Technology CO., LTD, Wuxi (CN)

(*) Notice: Subject to any disclaimer, the term of this patent is extended or adjusted under 35 U.S.C. 154(b) by 0 days.

(21) Appl. No.: 14/391,292
(22) PCT Filed: Apr. 8, 2013
(86) PCT No.: PCT/CN2013/073888
§ 371 (c)(1),
(2) Date: Oct. 8, 2014
(87) PCT Pub. No.: WO2013/152698
PCT Pub. Date: Oct. 17, 2013

(65) Prior Publication Data
US 2015/0069136 A1    Mar. 12, 2015

(30) Foreign Application Priority Data
Apr. 9, 2012    (CN) .......................... 2012 1 0101131

(51) Int. Cl.
G06K 19/07    (2006.01)
G05F 1/595    (2006.01)
G05F 3/30    (2006.01)

(52) U.S. Cl.
CPC ............ G06K 19/0709 (2013.01); G05F 1/595 (2013.01); G05F 3/30 (2013.01); G06K 19/0701 (2013.01); G06K 19/0723 (2013.01)

(58) Field of Classification Search
CPC .................................. G06K 19/07; G05F 3/30
See application file for complete search history.

(56) References Cited

U.S. PATENT DOCUMENTS 7,808,387 B1    10/2010    Kuhn
2012/0049905 A1*    3/2012    Takahashi ..................... 327/142

FOREIGN PATENT DOCUMENTS

| CN | 101876836 | 11/2010 |
|---|---|---|
| CN | 102354250 | 2/2012 |
| CN | 102651082 | 8/2012 |

*Primary Examiner* — Christopher Stanford
(74) *Attorney, Agent, or Firm* — Wayne & King LLC

(57) ABSTRACT

The present invention relates to the field of radio frequency, and provides a band-gap reference self-starting circuit and a passive radio frequency identification tag. The self-starting circuit comprises: a first switch device unit, configured to generate a first leakage current in an off state; a second switch device unit, configured to generate a second leakage current lower than the first leakage current in the off state, and generate a control voltage according to the first leakage current and the second leakage current; a control unit, configured to generate a starting control signal according to the control voltage; and a band-gap reference generating unit, configured to generate a reference voltage according to the starting control signal, and control the second switch device unit to enter dormancy using the reference voltage. The present invention boosts the control voltage using the leakage current generated by a field effect transistor in the off state, thereby implementing self-starting and generating the reference voltage, and controls the starting control unit to enter dormancy after the reference voltage is generated, thereby reducing system power consumption.

9 Claims, 2 Drawing Sheets

US 9,195,924 B2

BAND-GAP REFERENCE SELF-STARTING CIRCUIT AND A PASSIVE RADIO FREQUENCY IDENTIFICATION TAG

TECHNICAL FIELD

The present invention relates to the field of radio frequency, in particular, to a band-gap reference self-starting circuit and a passive radio frequency identification tag.

BACKGROUND

Radio frequency identification (RFID) technology is a contactless automatic identification technology, which can be applied to warehouse management, identification, transportation, food, medicine, animal management, and other fields. Due to its wide application, RFID technology in recent years receives more and more attention, and RFID systems with high performance need to dynamically adjust amplitude limiting circuit of rectifier circuit in the radio frequency front-end to meet the performance requirements according to different applications, temperatures and RF field strengths.

RFID tags can be categorized into passive tags and active tags. The energy of a passive RFID tag is harvested from the RF carrier wave energy emitted by the reader device without an external power supply. The RF signal is received by the antenna, and passed through internal rectifying circuit and voltage regulating circuit to form a stable power source required by the reset circuit and the digital circuit of the RFID tag. The voltage regulating circuit usually requires a constant band-gap reference voltage which does not change with temperature. The typical value of the band-gap voltage is usually 1.2 volts.

However, because the voltage regulating circuit does not work at the time when the passive RFID tag is just powered up, the voltage regulating circuit can't provide power to start up the digital circuit, which then is unable to output the logic start-up control signal to start the band-gap reference circuit. Therefore the band-gap reference circuit needs to achieve the functionality of self-start.

Band-gap reference circuit has two start-up modes. The first mode is the dynamic start-up during the power-up transition process that the power ramps from low voltage to high voltage. The typical situation that this mode occurs is as follows: the antenna of the passive RFID tag system receives a radio frequency signal, the radio frequency signal is then rectified and charges the on-chip capacitor to achieve charge accumulation, thereby forming an output voltage which has a power-up transition process that ramps from low to high, and the band-gap reference circuit should be triggered to achieve self-start during the transition process.

The second mode is a static start-up after the voltage of power source is stable, which is under the normal working condition without substantial level change, and the band-gap reference circuit must depend on the start-up circuit to enter into the on-state, making itself started to output the band-gap reference voltage.

The power consumed by the start-up circuit of the band-gap reference voltage module must be as small as possible. It is even desirable to be in a dormant state that consumes zero power after the completion of start-up. However, in the band-gap reference self-starting circuit of the prior art, because the power consumption is substantially large after start-up, or because the complicated structure leads a large chip area, the requirements of the passive RFID tag can't be best satisfied.

SUMMARY

The embodiment of the present invention aims at providing a band-gap reference self-starting circuit, to solve the problem that the band-gap reference self-starting circuit in the passive RFID tag in the prior has large power consumption.

The embodiment of the present invention is achieved by providing a band-gap reference self-starting circuit connected to a voltage regulating circuit or any circuit requiring a reference voltage. The band-gap reference self-starting circuit comprises:

a first switch device unit having a high potential end connected to a power source, configured to generate a first leakage current in an off state;

a second switch device unit having the higher potential end connected to the lower potential end of the first switch device unit, and the lower potential end connected to ground, configured to generate a second leakage current lower than the first leakage current in the off state, and generate a control voltage according to the first leakage current and the second leakage current;

a control unit having a control end connected to the lower potential end of the first switch device unit, and the output terminal connected to ground, configured to generate a starting control signal according to the control voltage; and a band-gap reference generating unit having the control end connected to an input end of the control unit, a power end connected to a power voltage, a grounding end connected to ground, and the output end connected to the control end of the second switch device unit, configured to generate a reference voltage according to the starting control signal, and control the second switch device unit to enter dormancy using the reference voltage.

Another purpose of the present invention is to provide a passive radio frequency identification tag using the band-gap reference self-starting circuit mentioned above.

The embodiment of the present invention boosts the control voltage using the leakage current generated by a field effect transistor in the off state, thereby realizing self-start and generating the reference voltage, and controls the starting control unit to enter dormancy after the reference voltage is generated, thereby reducing the system power consumption.

DETAILED DESCRIPTION

To achieve the objectives, technical solutions and advantages of the present invention clearer, the present invention will be further described hereafter with reference to the accompany drawings and embodiments. It shall be understood that, the embodiments described herein are only intended to illustrate but not to limit the present invention.

The embodiment of the present invention boosts the control voltage using the leakage current generated by a field effect transistor in the off state, thereby implementing self-starting and generating the reference voltage, and controls the starting control unit to enter dormancy after the reference voltage is generated, thereby reducing the system power consumption.

Figure 1:
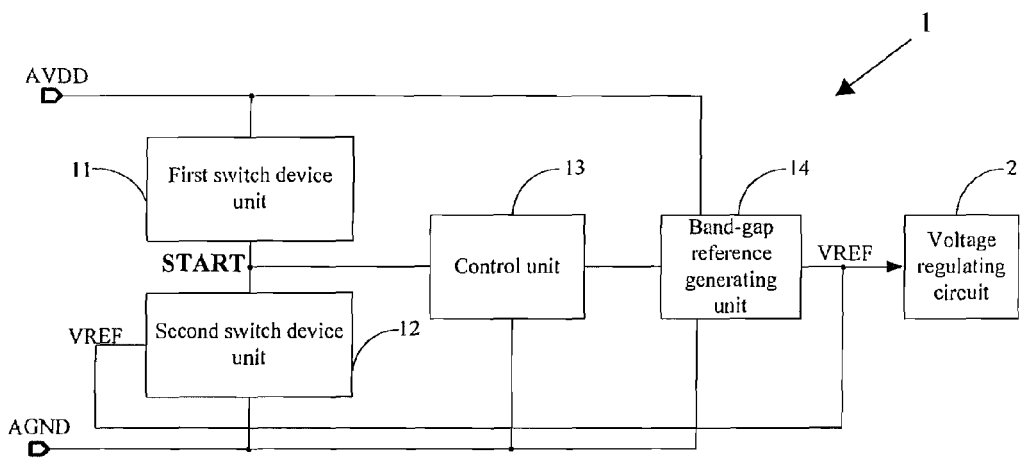
FIG. 1 is a structure diagram of the band-gap reference self-starting circuit according to an embodiment of the present invention.

FIG. 1 shows the structure diagram of the band-gap reference self-starting circuit according to an embodiment of the present invention. For illustration purposes, only the part related to the present invention is shown.

The band-gap reference self-starting circuit 1 of an embodiment of the present invention may be applied to any kind of passive RFID tag. The band-gap reference self-starting circuit 1 is connected to a voltage regulating circuit or any circuit 2 that needs a reference voltage and comprises:

a first switch device unit 11 having the higher potential end connected to a power source AVDD, configured to generate a first leakage current in an off state;

wherein in the embodiment of the present invention, the first switch device unit 11 consists of a plurality of reverse biased switch devices in parallel, the control end of each reverse biased switch device is connected to the input end thereof, all the input ends of the reverse biased switch devices serve as the high potential end of the first switch device unit 11, all the output ends of the reverse biased switch devices serve as the lower potential end of the first switch device unit 11.

a second switch device unit 12 having the higher potential end connected to the lower potential end of the first switch device unit, and the lower potential end connected to ground, is configured to generate a second leakage current lower than the first leakage current in the off state, and thus generates a control voltage according to the first leakage current and the second leakage current;

wherein in an embodiment of the present invention, the second switch device unit 12 consists of: a plurality of forward biased switch devices in series, the input end of the initial forward biased switch device of the series-connected forward biased switch devices serves as the higher potential end of the second switch device unit 12, the output end of the rear forward biased switch device serves as the lower potential end of the second switch device unit 12, and all the control ends of the forward biased switch devices are connected together and serve as the control end of the second switch device unit 12. The second leakage current is the series leakage current of the forward biased switch device in the off state and the second leakage current is less than the first leakage current;

a control unit 13 having a control end connected to the lower potential end of the first switch device unit 11, and the output terminal connected to ground, configured to generate a starting control signal according to the control voltage; and a band-gap reference generating unit 14 having the control end connected to an input end of the control unit 13 at a connection node PB, a power end connected to a power source AVDD, a grounding end connected to ground, and the output end connected to the control end of the second switch device unit 12, is configured to generate a reference voltage VREF according to the starting control signal, and thus controls the second switch device unit 12 to enter dormancy using the reference voltage.

During the power-up process, the first switch device unit 11 and the second switch device unit 12 are off, and the first leakage current is larger than the second leakage current, therefore the control voltage of the connection node (the self-starting node START) between the first switch device unit 11 and the second switch device unit 12 increases. When the control voltage increases to the threshold voltage of the control unit 13, the control unit 13 is turned on and outputs a starting control signal, to control the band-gap reference generating unit 14 to start, thereby achieving the self-starting to generate the reference voltage. After the reference voltage is generated, the band-gap reference generating unit 14 feeds the reference voltage back to the second switch device unit 12 to control the second switch device unit 12 to enter dormancy, thereby reducing the power consumption.

The embodiment of the present invention boosts the control voltage using the leakage current generated by a field effect transistor in the off state, thereby implementing self-starting and generating the reference voltage, and controls the starting control unit to enter dormancy after the reference voltage is generated, thereby reducing the system power consumption.

Implementation of the invention is described in detail hereafter with reference to the specific embodiment.

Figure 2:
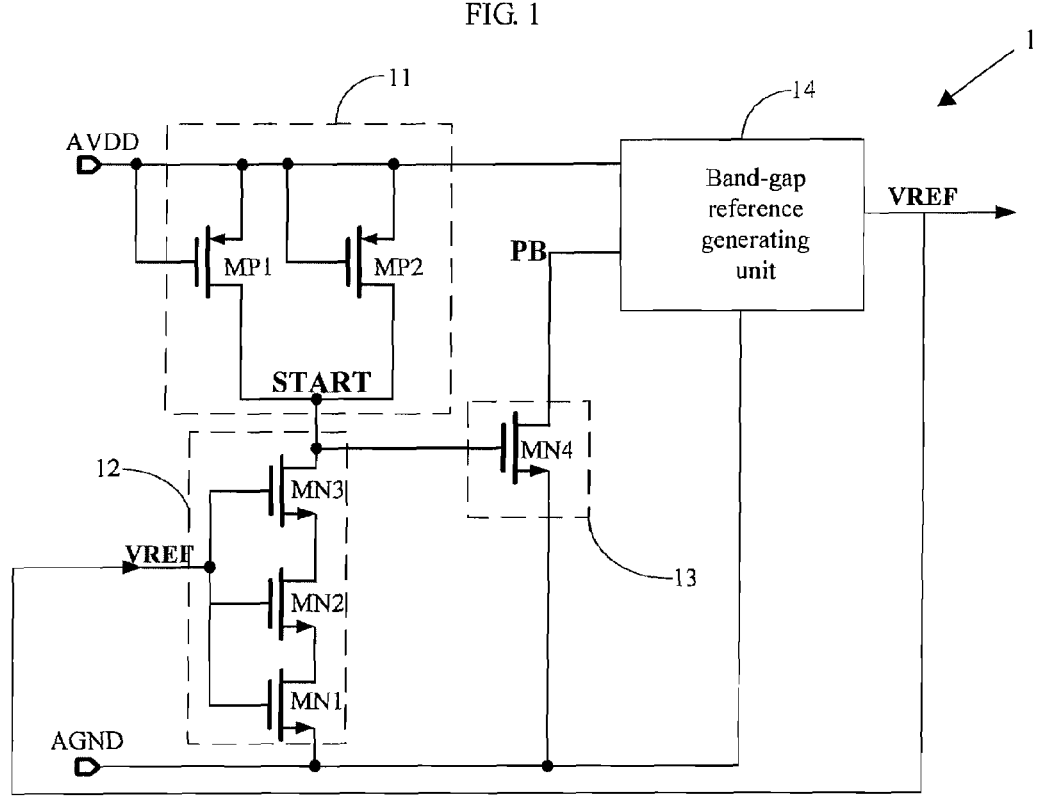
FIG. 2 is an exemplary circuit structure diagram of the band-gap reference self-starting circuit according to an embodiment of the present invention.

FIG. 2 shows the structure diagram of the band-gap reference self-starting circuit according to an embodiment of the present invention. For illustration purposes, only the part related to the present invention is shown.

In an embodiment of the present invention, the first switch device unit 11 comprises: a first reverse biased switch transistor MP1 and a second reverse biased switch transistor MP2;

wherein the control terminal of the first reverse biased switch transistor MP1 is connected to the input end of the first reverse biased switch transistor MP1; the control terminal of the second reverse biased switch transistor MP2 is connected to the input end of the second reverse biased switch transistor MP2; the input end of the first reverse biased switch transistor MP1 and the input end of the second reverse biased switch transistor MP2 are connected together to serve as the higher potential end of first switch device unit 11; the output end of the first reverse biased switch transistor MP1 and the output end of the second reverse biased switch transistor MP2 are connected together to serve as the lower potential end of first switch device unit 11.

In an embodiment of the present invention, the first reverse biased switch transistor MP1 and the second reverse biased switch transistor MP2 are P-type MOS transistors; the input end of the first reverse biased switch transistor MP1 and the input end of the second reverse biased switch transistor MP2 are the source terminals of the P-type MOS transistors; the output end of the first reverse biased switch transistor MP1 and the output end of the second reverse biased switch transistor MP2 are the drain terminals of the P-type MOS transistors; and the control end of the first reverse biased switch transistor MP1 and the control end of the second reverse biased switch transistor MP2 are the gate terminals of the P-type MOS transistors.

The second switch device unit 12 comprises:

a first forward biased switch transistor MN1, a second forward biased switch transistor MN2 and a third forward biased switch transistor MN3;

wherein the control end of the first forward biased switch transistor MN1, the control end of the second forward biased switch transistor MN2, and the control end of the third forward biased switch transistor MN3 are connected together to serve as the control end of the second switch device unit 12; the input end of the first forward biased switch transistor MN1 serves as the higher potential end of the second switch device unit 12; the output end of the first forward biased switch transistor MN1 is connected to the input end of the second forward biased switch transistor MN2; the output end of the second forward biased switch transistor MN2 is connected to the input end of the third forward biased switch transistor MN3; the output end of the third forward biased switch transistor MN3 serves as the lower potential end of the second switch device unit.

In an embodiment of the present invention, the first forward biased switch transistor MN1, the second forward biased switch transistor MN2 and the third forward biased switch transistor MN3 are N-type MOS transistors; the input end of the first forward biased switch transistor MN1, the input end of the second forward biased switch transistor MN2 and the input end of the third forward biased switch transistor MN3 are the drain terminals of the N-type MOS transistors; the output end of the first forward biased switch transistor MN1, the output end of the second forward biased switch transistor MN2 and the output end of the third forward biased switch transistor MN3 are the source terminals of the N-type MOS transistors; the control end of the first forward biased switch transistor MN1, the control end of the second forward biased switch transistor MN2 and the control end of the third forward biased switch transistor MN3 are the gate terminals of the N-type MOS transistors.

The control unit 13 can be implemented as the N-type MOS transistor MN4; the gate terminal of the N-type MOS transistor MN4 serves as the control end of the control unit 13; the drain terminal of the N-type MOS transistor MN4 serves as the input end of the control unit; and the source terminal of the N-type MOS transistor MN4 serves as the output end of the control unit 13.

In an embodiment of the present invention, the first reverse biased switch transistor MP1 and the second reverse biased switch transistor MP2 are connected together in a reverse bias manner, which makes sure the controlled current to be nearly zero under the normal work situation, and provides the first leakage current on the order of pico-ampere. In the off state, the charge flows from the power source to the self-starting node, and before the band-gap reference generating unit 14 has started up, the reference voltage of feedback control is zero; thus the series connected first forward biased switch transistor MN1, second forward biased switch transistor MN2 and third forward biased switch transistor MN3 are in off state. Therefore the charge is accumulated at the self-starting node START. Because the first leakage current is larger than the second leakage current, the control voltage of the self-starting node START is raised gradually. When the voltage of the self-starting node START increase to the threshold voltage of the N-type MOS transistor MN4, the voltage of the node PB is pulled down. As the node PB is connected to the gate of the PMOS transistor of the current mirror source of the band-gap reference generating unit, the PMOS transistor of the current mirror source is turned on, thereby setting up the corresponding DC operating point, and supplying the biasing current to make the band-gap reference voltage enter to the working-state, therefore the main circuit of the band-gap reference generating unit is made started up. The specific structure of the band-gap reference generating unit 14 exists in the prior art and may be implemented through many circuit, it's not described here.

The first forward biased switch transistor MN1, second forward biased switch transistor MN2 and third forward biased switch transistor MN3 remain in the off state before the self-starting is finished. After the band-gap reference generating unit 14 has been made started up, the reference voltage VREF of feedback control increases to the designed reference voltage, such as 1.2V, and is fed back to the gate of the series connected N-type MOS transistor, to turn the N-type MOS transistor on. Therefore the voltage of the self-starting node START is pulled down, and the N-type MOS transistor MN4 is turned off. Then the transistor MN4 stops pulling down the control end PB of the band-gap reference generating unit 14, and the start-up for the whole circuit is finished and the control part (first switch device unit 11, second switch device unit 12, and control unit 13) of the band-gap reference self-starting circuit 1 is equivalently removed from the band-gap reference generating unit 14 and becomes dormant, thus reducing the power consumption and meeting the requirements of the passive RFID tag on power consumption.

It should be noted that the channel dimensions of the P-type MOS transistors MP1, and MP2 need to satisfy the condition that the channel width be much greater than the channel length, where the total effect of parallel connected P-type MOS transistors is that the total channel width equals to the sum of the channel widths while the channel length is constant; and the channel dimensions of the N-type MOS transistors need to meet the condition that the channel width be far less than the channel length, where the total effect of series connected N-type MOS transistors is that the channel width is constant while the total channel length equals to the sum of the channel lengths.

The number of the parallel connected first reverse biased switch transistors is not limited to two and the number of the series connected first forward biased switch transistors is not limited to three, and the actual number depends on the practical design requirements, as long as the condition that the first leakage current being larger than the second leakage current is satisfied.

Figure 3:
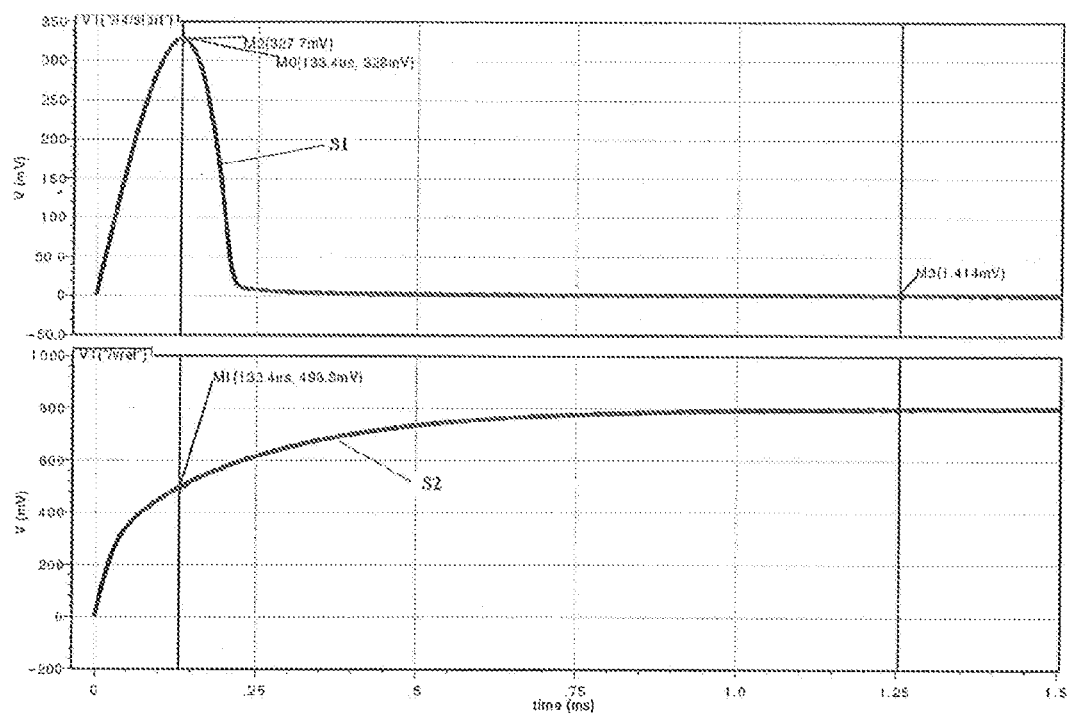
FIG. 3 is the voltage waveform on the time axis of the self-starting node START and the reference voltage VREF in the band-gap reference self-starting circuit according to an embodiment of the present invention.

FIG. 3 shows the voltage waveform on the time axis of the self-starting node START (FIGS. 1-2) and the reference voltage VREF (FIGS. 1-2), where 51 is the voltage waveform at the self-starting node START, and S2 is the voltage waveform at the control end of the second switch device unit 12 (FIGS. 1-2). It can be seen that when the voltage of the control end of the second switch device unit 12 reaches to the threshold voltage of 498 mV of NMOS being used for instance, the voltage of the self-starting node START is pulled down quickly.

Figure 4:
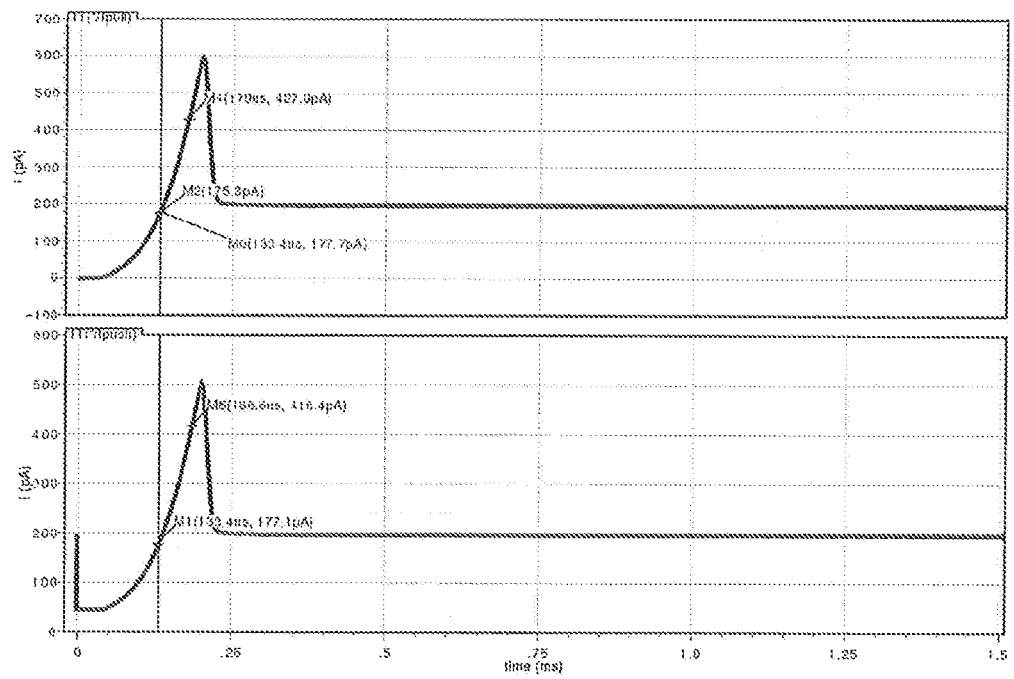
FIG. 4 is the current waveform of the band-gap reference self-starting circuit during the self-starting measured by simulation according to an embodiment of the present invention.

FIG. 4 shows the current waveform of the band-gap reference self-starting circuit during the self-starting measured by simulation. It can be seen that at the starting moment, the leakage current is 177 pA, and the maximum current in the branch during the whole starting process is 600 pA, which meets the requirement of low power consumption.

Another purpose of the present invention is to provide a passive radio frequency identification tag using the band-gap reference self-starting circuit mentioned above.

The embodiment of the present invention boosts the control voltage using the leakage current generated by a field effect transistor in the off state, thereby generating the reference voltage and implementing self-starting, and controls the starting control unit to enter dormancy after the reference voltage is generated, thereby reducing a system power consumption. After the circuit is started, the leakage current of the PMOS whose source and gate are connected together is less than 1 nA due to the reverse biased connection. Compared with the existing technology using a resistor or PMOS transistor with the gate connected to ground, the static current is minimized, namely on the premise of ensuring the function, using fewer MOS transistor and less area, to achieve the lowest power consumption. Compared to the start-up circuit existing in the prior art, the current power consumption is less than one nano-ampere by using the reverse connection structure.

The circuit structure can accomplish the self-starting functionality in any electronic system, which is especially suitable for mobile equipment systems with low power consumption, for example, passive RFID systems. The circuit has a simple structure, small size, and is easy to implement.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A band-gap reference self-starting circuit, connected to a voltage regulating circuit or any circuit requiring a reference voltage, wherein the band-gap reference self-starting circuit comprises:
    a first switch device unit having a higher potential end connected to a power source, configured to generate a first leakage current in an off state;
    a second switch device unit having a higher potential end connected to a lower potential end of the first switch device unit, and a lower potential end of the second switch device unit being connected to ground, configured to generate a second leakage current lower than the first leakage current in the off state, and generate a control voltage according to the first leakage current and the second leakage current;
    a control unit having a control end connected to the lower potential end of the first switch device unit, and an output terminal connected to ground, configured to generate a starting control signal according to the control voltage; and
    a band-gap reference generating unit having a control end connected to an input end of the control unit, a power end connected to the power source, a grounding end connected to ground, and an output end connected to a control end of the second switch device unit, configured to generate a reference voltage according to the starting control signal, and control the second switch device unit to enter dormancy using the reference voltage.

2. The self-starting circuit of claim 1, wherein the first switch device unit comprises:
    a plurality of reverse biased switch devices in parallel, a control end of each reverse biased switch device connected to an input end thereof, all the input ends of the reverse biased switch devices being the higher potential end of the first switch device unit, all the output ends of the reverse biased switch devices being the lower potential end of the first switch device unit.

3. The self-starting circuit of claim 2, wherein the second switch device unit comprises:
    a plurality of forward biased switch devices in series, an input end of an initial forward biased switch device of the series-connected forward biased switch devices being the higher potential end of the second switch device unit, an output end of a rear forward biased switch device being the lower potential end of the second switch device unit, and all control ends of the forward biased switch devices being the control end of the second switch device unit.

4. The self-starting circuit of claim 1, wherein the first switch device unit comprises:
    a first reverse biased switch transistor and a second reverse biased switch transistor;
    a control terminal of the first reverse biased switch transistor is connected to an input end of the first reverse biased switch transistor, a control terminal of the second reverse biased switch transistor is connected to an input end of the second reverse biased switch transistor, the input end of the first reverse biased switch transistor and the input end of the second reverse biased switch transistor are connected together to serve as the higher potential end of first switch device unit, an output end of the first reverse biased switch transistor and an output end of the second reverse biased switch transistor are connected together to serve as the lower potential end of first switch device unit.

5. The self-starting circuit of claim 4, wherein the first reverse biased switch transistor and the second reverse biased switch transistor are P-type MOS transistors, the input end of the first reverse biased switch transistor and the input end of the second reverse biased switch transistor are source terminals of the P-type MOS transistors, the output end of the first reverse biased switch transistor and the output end of the second reverse biased switch transistor are drain terminals of the P-type MOS transistors, and the control end of the first reverse biased switch transistor and the control end of the second reverse biased switch transistor are gate terminals of the P-type MOS transistors.

6. The self-starting circuit of claim 1, wherein the second switch device unit comprises:
    a first forward biased switch transistor, a second forward biased switch transistor, and a third forward biased switch transistor;
    a control end of the first forward biased switch transistor, a control end of the second forward biased switch transistor, and a control end of the third forward biased switch transistor are connected together to serve as the control end of the second switch device unit, an input end of the first forward biased switch transistor is the higher potential end of the second switch device unit; an output end of the first forward biased switch transistor is connected to an input end of the second forward biased switch transistor, an output end of the second forward biased switch transistor is connected to an input end of the third forward biased switch transistor, an output end of the third forward biased switch transistor is the lower potential end of the second switch device unit.

7. The self-starting circuit of claim 6, wherein the first forward biased switch transistor, the second forward biased switch transistor and the third forward biased switch transistor are N-type MOS transistors, the input end of the first forward biased switch transistor, the input end of the second forward biased switch transistor and the input end of the third forward biased switch transistor are drain terminals of the N-type MOS transistors; the output end of the first forward biased switch transistor, the output end of the second forward biased switch transistor and the output end of the third forward biased switch transistor are source terminals of the N-type MOS transistors; the control end of the first forward biased switch transistor, the control end of the second forward biased switch transistor and the control end of the third forward biased switch transistor are gate terminals of the N-type MOS transistors.

8. The self-starting circuit of claim 1, wherein the control unit is an N-type MOS transistor; a gate of the N-type MOS transistor is the control end of the control unit; a drain terminal of the N-type MOS transistor is the input end of the control unit; and a source of the N-type MOS transistor is the output end of the control unit.

9. A passive radio frequency identification tag, wherein a band-gap reference self-starting circuit in the passive radio frequency identification tag is the band-gap reference self-starting circuit of claim 1.

* * * * *